United States Patent [19]

Dittrich et al.

[11] Patent Number: 5,405,693
[45] Date of Patent: Apr. 11, 1995

[54] DISPERSION CONTACT ADHESIVE HAVING LITTLE ODOR

[75] Inventors: Uwe Dittrich, Ludwigshafen; Bernd Stanger, Dudenhofen; Josef Neutzner, Neustadt; Peter Pfoehler, Speyer; Helmut Mueller, Kaiserslautern; Johannes Tuerk, Boehl-Iggelheim, all of Germany

[73] Assignee: BASF Aktiengesellschaft, Ludwigshafen, Germany

[21] Appl. No.: 113,302

[22] Filed: Aug. 30, 1993

[30] Foreign Application Priority Data

May 17, 1993 [DE] Germany .................. 43 16 379.3

[51] Int. Cl.$^6$ ................................. B32B 7/12
[52] U.S. Cl. ........................... 428/355; 428/461; 428/511; 428/514; 428/516; 428/522; 524/556; 524/558; 524/560; 524/561; 524/562; 524/833
[58] Field of Search ............... 524/558, 560, 561, 562, 524/833, 556; 428/355, 461, 511, 514, 516, 522

[56] References Cited

U.S. PATENT DOCUMENTS 4,313,861 2/1982 Bassett et al. .................. 524/558
5,008,329 4/1991 Abe et al. ..................... 524/833 X

FOREIGN PATENT DOCUMENTS 2459160 6/1976 Germany.
3013812 10/1981 Germany.

OTHER PUBLICATIONS

Japanese Abstract No. 61 073 781 vol. 105 No. 20, Nov. 17, 1986.

Primary Examiner—Judy M. Reddick
Attorney, Agent, or Firm—Oblon, Spivak, McClelland, Meier, & Neustadt

[57] ABSTRACT

An aqueous dispersion containing a copolymer comprising a) 60–95% by weight of a $C_2$–$C_{10}$-alkyl (meth)acrylate
b) 5–40% by weight of methyl acrylate
c) 0–30% by weight of methyl methacrylate
d) 0–30% by weight of a $C_8$–$C_{12}$-vinylaromatic compound
e) 0–10% by weight of a $C_1$–$C_{10}$-hydroxyalkyl (meth)acrylate
f) 0–5% by weight of an ethylenically unsaturated $C_3$–$C_5$-carboxylic acid or dicarboxylic acid
g) 0–20% by weight of further ethylenically unsaturated compounds, vinyl acetate and chlorine-containing compounds being excluded, is used as an adhesive.

3 Claims, No Drawings

DISPERSION CONTACT ADHESIVE HAVING LITTLE ODOR

The present invention relates to the use of an aqueous dispersion containing a copolymer comprising
- a) 60–95% by weight of a $C_2$–$C_{10}$-alkyl (meth)acrylate
- b) 5–40% by weight of methyl acrylate
- c) 0–30% by weight of methyl methacrylate
- d) 0–30% by weight of a $C_8$–$C_{12}$-vinylaromatic compound
- e) 0–10% by weight of a $C_1$–$C_{10}$-hydroxyalkyl (meth)acrylate
- f) 0–5% by weight of an ethylenically unsaturated $C_3$–$C_5$-carboxylic acid or dicarboxylic acid
- g) 0–20% by weight of further ethylenically unsaturated compounds, vinyl acetate and chlorine-containing compounds being excluded, as an adhesive.

The present invention furthermore relates to aqueous dispersions containing a copolymer comprising
- a) 70–90% by weight of a $C_2$–$C_{10}$-alkyl (meth) acrylate
- b) 5–20% by weight of methyl acrylate
- c) 0–20% by weight of methyl methacrylate
- d) 0–20% by weight of a $C_8$–$C_{12}$-vinylaromatic compound
- e) 0–5% by weight of a $C_1$–$C_{10}$-hydroxyalkyl (meth)acrylate
- f) 0–3% by weight of an ethylenically unsaturated $C_3$–$C_5$-carboxylic acid or dicarboxylic acid
- g) 0–5% by weight of further ethylenically unsaturated compounds, vinyl acetate and chlorine-containing compounds being excluded, and substrates coated with the aqueous dispersion, such as self-adhesive tapes, films and labels.

Requirements which copolymers have to meet when used as adhesives, for example contact adhesives, are in particular good adhesion to surfaces and good internal strength (cohesion), in order to achieve a very firm adhesive bond. These two requirements can scarcely be met equally well since many measures which, for example, give good cohesion in turn have an adverse effect on the adhesion.

Polyacrylates have also proven particularly suitable as contact adhesives.

Aqueous dispersion contact adhesives based on polyacrylates are disclosed, in, for example, DE-A 24 59 160 and DE-A 30 13 812. In order to improve the adhesion, the polyacrylates generally contain vinyl acetate. However, vinyl acetate has the disadvantage that acetaldehyde is readily eliminated and an odor annoyance may thus occur.

It is an object of the present invention to provide adhesives, in particular polyacrylate-based contact adhesives, which contain no vinyl acetate and have both good adhesion and cohesion.

We have found that this object is achieved by the use of the aqueous dispersion, defined above, as an adhesive and by the dispersions as such defined above, which are suitable for use as adhesives.

The aqueous dispersions contain a copolymer which comprises the monomers a) to g).

The monomers a) are preferably $C_4$–$C_{10}$-alkyl (meth)acrylates, particularly preferably alkyl acrylates. Examples are n-butyl acrylate, n-hexyl acrylate and in particular 2-ethylhexyl acrylate.

Examples of suitable vinylaromatic monomers d) are α-methylstyrene and in particular styrene.

Preferred hydroxyalkyl (meth)acrylates e) are $C_2$–$C_8$-hydroxyalkyl (meth) acrylates, particularly preferably $C_2$–$C_4$-hydroxyalkyl (meth) acrylates.

Examples are n-hydroxyethyl acrylate, n-hydroxypropyl acrylate and n-hydroxybutyl acrylate.

Monomers f) are in particular acrylic acid or methacrylic acid. Other suitable examples are maleic acid or fumaric acid and the anhydrides thereof.

In addition to the monomers a) to f), the copolymers may contain further monomers g) which differ from the monomers a) to f). The further monomers are not vinyl acetate or chlorine-containing monomers, such as vinylidene chloride.

Examples of monomers g) are in particular those having sulfate or sulfonate groups, which improve the emulsifiability of the copolymer, for example vinylsulfonic acid or its alkali metal or alkaline earth metal salts, in particular sodium vinylsulfonate. Vinyl esters of carboxylic acids of 3 or 4 carbon atoms are less suitable.

The content of these monomers is in general from 0.1 to 3% by weight. Other suitable monomers g) are, for example, (meth)acrylonitrile, (meth)acrylamide and vinyl ether.

Mixtures of the monomers mentioned in each case under a) and d) to g) may also be used.

The copolymer preferably comprises
- 70–90% by weight of the monomers a),
- 5–20% by weight of methyl acrylate b),
- 0–20, particularly preferably 1–10, % by weight of methyl methacrylate c),
- 0–20, particularly preferably 0–5, % by weight of a $C_8$–$C_{12}$-vinylaromatic compound d),
- 0–5, particularly preferably 0.5–5, % by weight of a $C_1$–$C_{10}$-hydroxyalkyl (meth) acrylate e ),
- 0–3, particularly preferably 0.1 –2, % by weight of an ethylenically unsaturated $C_3$–$C_5$-carboxylic acid or dicarboxylic acid or anhydrides thereof f) and
- 0–5, particularly preferably 0–3, in particular 0.1–3, % by weight of a further ethylenically unsaturated compound g).

The monomers are preferably chosen so that the glass transition temperature of the copolymer is less than 0° C., in particular less than −15° C. In general, the glass transition temperature is from −15° to −45° C.

The glass transition temperature can be determined by conventional methods, for example from the measurement of the modulus of elasticity in the creep test as a function of the temperature or by differential thermal analysis (DTA) (cf. A. Zosel, Farbe und Lack 82 (1976), 125–134).

The K value as a measure of the molecular weight of the copolymer is preferably from 60 to 100, particularly preferably from 80 to 100.

The K value is measured in a 1% strength by weight solution of the copolymer in tetrahydrofuran at 20° C. and determined according to Fikentscher (Cellulose-Chemie 13 (1932) 58).

The copolymers are preferably prepared by emulsion polymerization.

Examples of suitable water-soluble initiators for the emulsion polymerization are peroxides, such as sodium peroxide, potassium peroxide, ammonium peroxide and hydrogen peroxide, or perborates.

For example, alkali metal salts of fatty acids, such as sodium stearate or sodium oleate, alkali metal salts of sulfated oils, alkali metal salts of sulfonic acids, in particular alkylsulfonic acids, alkali metal salts of oxyalkylated alkylphenols, diphenyl ethers substituted by one or two alkylsulphate groups and poly adducts of alkylene oxides, such as ethylene oxide, propylene oxide or a mixture thereof, with fatty acids, fatty alcohols, fatty amides or alkylphenols may be used as emulsifiers or dispersants.

Furthermore, regulators which reduce the molecular weight may also be used in the polymerization (chain-transfer agents). For example, compounds having a thiol group, such as tertbutyl mercaptan or tert-dodecyl mercaptan, are suitable. The amount of these regulators may be in particular from 0 to 0.3% by weight, based on the copolymer.

The temperature during the emulsion polymerization is preferably from 40° to 100° C., in particular from 70° to 95° C.

A feed process in which a part of the monomers, in particular up to 10% by weight, is initially taken together with water, emulsifiers, initiators and, if required, regulators has proven particularly useful for the emulsion polymerization.

The remainder of the monomers, emulsified in water, can be metered in at the polymerization temperature simultaneously with an aqueous solution of further amounts of initiator. The compositions of the initially taken monomer mixture and of the metered monomer mixture may be identical or different.

The aqueous dispersion finally obtained in the emulsion polymerization preferably has a solids content of from 40 to 70% by weight. The aqueous dispersions of the copolymers are suitable as adhesive dispersions.

The aqueous copolymer dispersions are particularly suitable as contact adhesives.

For this use, further tackifiers, as disclosed, for example, in Adhesives Age, July 1987, pages 19–23 or Polym. Mater. Sci. Eng., 61 (1989), 588–592, may be added to the aqueous dispersions. These tackifiers are in particular dispersed natural or synthetic resin acids or esters thereof. The weight ratio of novel polymer to tackifier is preferably from 5:1 to 1:5, particularly preferably from 2:1 to 1:1.

The dispersions may contain conventional amounts of thickeners, plasticizers and/or pigments as further additives.

Furthermore, inorganic or organic fillers may be used as additives. Examples of such fillers are chalk, glass microspheres, mineral silicates or Teflon powder.

For the production of contact adhesive products, the dispersions can be applied to suitable substrates in a conventional manner, for example by spraying, knife-coating, coating with a roller covered with a hard or soft material, casting or immersion.

Indirect application of the dispersions, for example by the transfer process using a siliconized paper, is also possible. After the application, the coated substrates are dried in a conventional manner.

The dispersions can be used, inter alia, for the production of adhesive labels or other self-adhesive articles, such as self-adhesive tapes or self-adhesive films. Suitable substrates are, for example, films of polyethylene, polypropylene, polyethylene glycol terephthalate and polyvinyl chloride, metal foils and paper.

The adhesive layers obtained possess both good adhesion to the substrate surfaces and good cohesion. There is no odor annoyance as frequently found with the use of vinyl acetate as a result of elimination of acetaldehyde.

EXAMPLE

In the examples which follow, parts and percentages are by weight.

Copolymer dispersion A:

493.5 g of water, 14.1 g of sodium pyrophosphate, 7.0 g of the sodium salt of ethylenediaminetetraacetic acid and 3.5 g of a 40% strength aqueous sodium alkylsulfonate of 12 to 16 carbon atoms were thoroughly mixed in a pressure-resistant stirred kettle. After the mixture had been heated to 80° C., a suspension of 3.5 g of sodium persulfate in 47 g of water was added to the stirred kettle.

The following monomer emulsion was prepared beforehand in a feed vessel (Feed I):
  1484 g of water
  112.8 g of a 35% strength solution of the sodium salt of the sulfuric ester of ethoxylated nonylphenol (25 ethylene oxide units)
  3.5 g of tert-dodecyl mercaptan
  70.9 g of 97% strength acrylic acid
  5881.6 g of 2-ethylhexyl acrylate
  57.0 g of sodium vinylsulfonate
  850.3 g of methyl acrylate
  212.6 g of methyl methacrylate
  70.9 g of 2-hydroxypropyl acrylate
  0.0035 g of hydroquinone monomethyl ether A solution of 52.8 g of sodium persulfate in 705 g of water was kept ready in a further feed vessel (Feed II). Feed I was added to the mixture initially taken in the stirred kettle, which mixture was kept at 80° C. The feed rate (volume/time) was increased to about 2.5 times the initial rate in the course of the first half hour and then kept constant.

Simultaneously with Feed I, Feed II was added to the stirred kettle uniformly in the course of 5 hours. After the end of Feeds I and II, the temperature of the stirred kettle was kept at 80° C. for a further hour, after which the kettle was cooled. A 60% strength by weight coagulum-free and speck-free polymer dispersion which is suitable as a raw material for contact adhesives was obtained.

The preparation of the copolymer dispersions B-D was carried out as for copolymer A.

The composition of the monomers is shown in Table 1.

TABLE 1

| Composition of the copolymers in % by weight | | | | | | | |
|---|---|---|---|---|---|---|---|
| Copolymer | EHA | BA | MA | VAc | MMA | AA | HPA |
| A | 83 | — | 12 | — | 3 | 1 | 1 |
| B* | 83 | — | — | 12 | 3 | 1 | 1 |
| C | — | 83 | 12 | — | 3 | 1 | 1 |
| D* | — | 83 | — | 12 | 3 | 1 | 1 |

*for comparison

Abbreviations
  EHA: 2-ethylhexyl acrylate
  BA: n-butyl acrylate
  MA: methyl acrylate
  VAc: vinyl acetate
  MMA: methyl methacrylate
  AA: acrylic acid
  HPA: hydroxypropyl acrylate Testing of the performance characteristics In order to test the performance characteristics, the dispersions were mixed with a rosin, the mixtures were applied to label paper (80 g/m², Hering) by knife-coating in a weight of about 20 g/m² and the coated sheets were dried for 3 minutes at 90° C. in a through-circulation drier. The coated sheets where then cut into 2 cm wide test strips.

In order to determine the shear strength, the adhesive strips were stuck to a chromium-plated V2A stainless steel test sheet over an adhesively bonded area of 0.5×0.5 inch, rolled once with a 1 kg roller, stored for 20 minutes and then loaded with 0.5 kg weight by suspending the latter. The measure of the shear strength was the time taken for the weight to fall off; the average of 5 measurements was calculated in each case. In these measurements, the adhesive layer was destroyed (loss of cohesion).

The shear strength was determined at 23° C.

In the determination of the peel strength (adhesion), a 2.0 cm wide adhesive strip was stuck to a chromium-plated V2A stainless steel test sheet and rolled once with a 1 kg roller. One end of said adhesive strip was then clamped in the upper jaws of a tensile test apparatus. The adhesive strip was peeled off from the test surface (V2A stainless steel) at 300 mm/min at an angle of 180°, and the force required for this purpose was measured. The measure of the peel strength was the force, in N/2 cm, which was obtained as the average value of five measurements.

The peel strength was determined 24 hours after adhesive bonding.

The results are shown in the table.

TABLE

|   | Peel strength [N/2 cm] after 24 h | Shear strength [h] |
|---|---|---|
| A | 7.9 | >48 |
| B | 4.1 | 3.7 |
| C | 7.3 | >48 |
| D | <0.3 | 8.0 |

We claim:

1. An aqueous dispersion containing a copolymer comprising:
   a) 70–90% by weight of a $C_2$–$C_{10}$-alkyl (meth)acrylate;
   b) 5–20% by weight of methyl acrylate;
   c) 1–10% by weight of methyl methacrylate;
   d) 0–5% by weight of a $C_8$–$C_{12}$-vinylaromatic compound;
   e) 0.5–5% by weight of a $C_1$–$C_{10}$-hydroxyalkyl (meth)acrylate;
   f) 0.1–2% by weight of an ethylenically unsaturated $C_3$–$C_5$-carboxylic acid or dicarboxylic acid or anhydrides thereof;
   g) 0–3% by weight of further ethylenically unsaturated compounds;
   wherein vinyl acetate and chlorine-containing compounds are excluded, and wherein the glass transition temperature of said copolymer is less than 0° C.

2. A substrate coated with dispersion as claimed in claim 1.

3. A self-adhesive tape, self-adhesive film, or self-adhesive label coated with a dispersion as claimed in claim 1.

* * * * *